(12) United States Patent
Wang et al.

(10) Patent No.: US 12,099,419 B2
(45) Date of Patent: Sep. 24, 2024

(54) SYSTEMS AND METHODS FOR SYSTEM RECOVERY

(71) Applicant: ZHEJIANG DAHUA TECHNOLOGY CO., LTD., Zhejiang (CN)

(72) Inventors: Linfeng Wang, Hangzhou (CN); Qiliang Wei, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 18/049,279

(22) Filed: Oct. 24, 2022

(65) Prior Publication Data

US 2023/0083327 A1    Mar. 16, 2023

Related U.S. Application Data

(63) Continuation of application No. PCT/CN2021/089858, filed on Apr. 26, 2021.

(30) Foreign Application Priority Data

Apr. 28, 2020 (CN) .......................... 202010351076.4

(51) Int. Cl.
*G06F 11/20* (2006.01)
(52) U.S. Cl.
CPC ...... *G06F 11/2038* (2013.01); *G06F 11/2046* (2013.01); *G06F 2201/86* (2013.01)
(58) Field of Classification Search
CPC ............. G06F 11/2038; G06F 11/2046; G06F 2201/86
See application file for complete search history.

(56) References Cited

U.S. PATENT DOCUMENTS 10,339,010 B1    7/2019 Talley et al.
10,970,179 B1*   4/2021 Ruslyakov .......... G06F 11/3006
(Continued)

FOREIGN PATENT DOCUMENTS

CN    103220183 A    7/2013
CN    104268038 A    1/2015
(Continued)

OTHER PUBLICATIONS

International Search Report in PCT/CN2021/089858 mailed on Jun. 25, 2021, 4 pages.
Written Opinion in PCT/CN2021/089858 mailed on Jun. 25, 2021, 5 pages.
(Continued)

*Primary Examiner* — Jigar P Patel
(74) *Attorney, Agent, or Firm* — METIS IP LLC

(57) ABSTRACT

A method for system recovery may be provided. The method may be implemented on a management server of a recovery system. The recovery system may further include at least one working server configured to perform one or more tasks and a global storage device configured to store a backup system or a system image file of each of the at least one working server. The management server may be connected to the at least one working server and the global storage device. The method may include, for each of the at least one working server, determining whether the working server is in an abnormal state. For each of the at least one working server, in response to determining that the working server is in an abnormal state, the method may further include assigning at least part of the global storage device to the working server and causing the working server to perform a first system recovery operation using the at least part of the global storage device.

20 Claims, 10 Drawing Sheets

(56) References Cited

U.S. PATENT DOCUMENTS

| | | |
|---|---|---|
| 11,144,233 B1* | 10/2021 | Singhal .................. G06F 3/0619 |
| 2005/0050115 A1* | 3/2005 | Kekre .................. G06F 11/2058 |
| 2005/0081004 A1 | 4/2005 | Zhang |
| 2007/0106709 A1 | 5/2007 | Augenstein et al. |
| 2007/0185934 A1 | 8/2007 | Cannon et al. |
| 2010/0115332 A1 | 5/2010 | Zheng et al. |
| 2013/0326260 A1 | 12/2013 | Wei et al. |
| 2014/0236898 A1* | 8/2014 | Hankins .................. G06F 3/0689 |
| | | 707/639 |
| 2015/0006835 A1 | 1/2015 | Oberhofer et al. |
| 2016/0085606 A1* | 3/2016 | Panasko .............. G06F 11/0727 |
| | | 714/37 |
| 2017/0185498 A1 | 6/2017 | Gao et al. |
| 2018/0352032 A1 | 12/2018 | Liu et al. |
| 2019/0324875 A1 | 10/2019 | Gong et al. |

FOREIGN PATENT DOCUMENTS

| | | |
|---|---|---|
| CN | 104462148 A | 3/2015 |
| CN | 105302667 A | 2/2016 |
| CN | 107315661 A | 11/2017 |
| CN | 107590030 A | 1/2018 |
| CN | 107665158 A | 2/2018 |
| CN | 107818029 A | 3/2018 |
| CN | 108958989 A | 12/2018 |
| CN | 110990124 A | 4/2020 |
| CN | 111045802 A | 4/2020 |
| WO | 2021218904 A1 | 11/2021 |

OTHER PUBLICATIONS

Partial Supplementary European Search Report in European Application No. 21797792.5 mailed on Aug. 8, 2023, 16 pages.

* cited by examiner

SYSTEMS AND METHODS FOR SYSTEM RECOVERY

CROSS-REFERENCE TO RELATED APPLICATIONS

This application is a continuation of International Application No. PCT/CN2021/089858, filed on Apr. 26, 2021, which claims priority of Chinese Patent Application No. 202010351076.4, filed on Apr. 28, 2020, the entire contents of which are incorporated herein by reference.

TECHNICAL FIELD

The present disclosure generally relates to system recovery, and in particular to systems and methods for system recovery in a computing system.

BACKGROUND

An effective system recovery method is vital to maintain a long-term stable operation of a computing system (e.g., a cluster system, a distributed system, etc.). Therefore, it is desirable to provide efficient and feasible systems and methods for system recovery.

SUMMARY

According to an aspect of the present disclosure, a system for system recovery may be provided. The system may include at least one working server configured to perform one or more tasks, a global storage device configured to store a backup system or a system image file of each of the at least one working server, and a management server connected to the at least one working server and the global storage device. The management server may be configured to perform one or more of the following operations. For each of the at least one working server, the management server may be configured to determine whether the working server is in an abnormal state. In response to determining that the working server is in an abnormal state, the management server may be further configured to assign at least part of the global storage device to the working server and cause the working server to perform a first system recovery operation using the at least part of the global storage device.

In some embodiments, the at least one working server, the global storage device, and the management server may form a storage area network (SAN).

In some embodiments, the global storage device may include a plurality of global storage units, and to assign at least part of the global storage device to the working server and cause the working server to perform a first system recovery operation using the at least part of the global storage device, the management server may be configured to select a target global storage unit storing the backup system or the system image file of the working server from the plurality of global storage units. The management server may be further configured to assign the target global storage unit to the working server and cause the working server to perform the first system recovery operation using the target global storage unit.

In some embodiments, for each of the at least one working server, the working server may be connected to a first local storage device, and to cause the working server to perform a first system recovery operation using the at least part of the global storage device, the management server may be configured to cause the working server to perform the first system recovery using the first local storage device. The management server may be also configured to detect that the first system recovery operation using the first local storage device is not successful. The management server may be further configured to cause the working server to perform the first system recovery using the at least part of the global storage device.

In some embodiments, for each of the at least one working server, the management server may be configured to recover the first local storage device based on the backup system or the system image file of the working server. The management server may be also configured to determine whether the first local storage device recovers successfully. In response to determining that the first local storage device recovers successfully, the management server may be further configured to cause the working server to restart using the recovered first local storage device and cause the global storage device to be in a safe state under which the global storage device is inaccessible to the at least one working server and the management server.

In some embodiments, for each of the at least one working server, in response to determining that the first local storage device is not recovered successfully, the management server may be configured to cause the working server to keep operating using the at least part of the global storage device.

In some embodiments, the system may include at least one standby global storage device that stores the backup system or the system image file of each of the at least one working server.

In some embodiments, a backup system or a system image file of the management server may be stored in the global storage device. The system may include a standby management server configured to take over one or more tasks of the management server when the management server is in an abnormal state.

In some embodiments, when the management server is in an abnormal state, the standby management server may be configured to assign at least part of the global storage device to the management server and cause the management server to perform a second system recovery operation using the at least part of the global storage device.

In some embodiments, the management server is connected to a second local storage device, and to cause the management server to perform a second system recovery operation using the at least part of the global storage device, the standby management server may be configured to cause the management server to perform the second system recovery using the second local storage device. The standby management server may be also configured to detect that the second system recovery operation using the second local storage device is not successful. The standby management server may be further configured to cause the management server to perform the second system recovery operation using the at least part of the global storage device.

According to another aspect of the present disclosure, a method for system recovery may be provided. The method may be implemented on a management server of a recovery system. The recovery system may further include at least one working server configured to perform one or more tasks and a global storage device configured to store a backup system or a system image file of each of the at least one working server. The management server may be connected to the at least one working server and the global storage device. The method may include, for each of the at least one working server, determining whether the working server is in an abnormal state. For each of the at least one working server, in response to determining that the working server is in an abnormal state, the method may further include assigning at least part of the global storage device to the working server and causing the working server to perform a first system recovery operation using the at least part of the global storage device.

According to yet another aspect of the present disclosure, a non-transitory computer readable medium may be provided. The non-transitory computer readable medium may include a set of instructions for system recovery. The set of instructions may be executed by a management server of a recovery system. The recovery system may further include at least one working server configured to perform one or more tasks and a global storage device configured to store a backup system or a system image file of each of the at least one working server. The management server may be connected to the at least one working server and the global storage device. When the set of instructions are executed by at least one processor of the management server, the set of instructions causes the management server to perform a method. The method may include, for each of the at least one working server, determining whether the working server is in an abnormal state. For each of the at least one working server, in response to determining that the working server is in an abnormal state, the method may further include assigning at least part of the global storage device to the working server and causing the working server to perform a first system recovery operation using the at least part of the global storage device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "engine," "unit," "module," and/or "block" used herein are one method to distinguish different components, elements, parts, section or assembly of different level in ascending order. However, the terms may be displaced by other expressions if they may achieve the same purpose.

Figure 2:
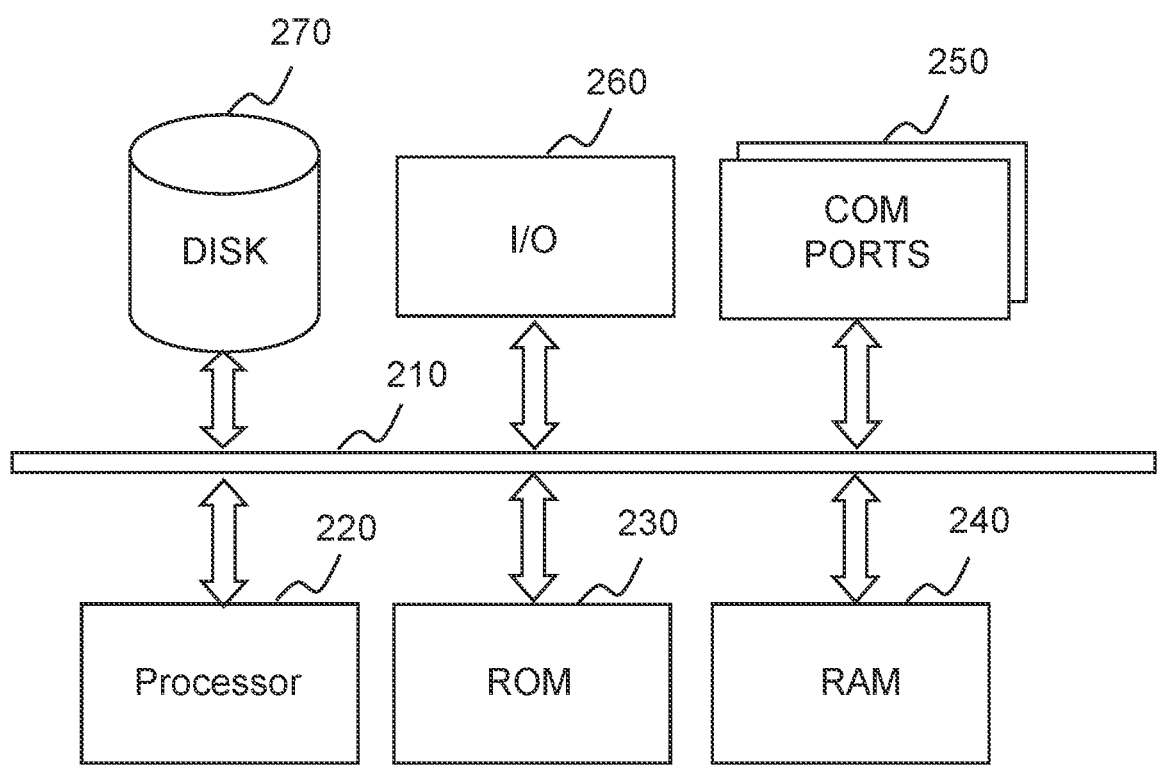
FIG. 2 is a schematic diagram illustrating exemplary hardware and/or software components of a computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage devices. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 220 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules (or units or blocks) may be included in connected logic components, such as gates and flip-flops, and/or can be included in programmable units, such as programmable gate arrays or processors. The modules (or units or blocks) or computing device functionality described herein may be implemented as software modules (or units or blocks) but may be represented in hardware or firmware. In general, the modules (or units or blocks) described herein refer to logical modules (or units or blocks) that may be combined with other modules (or units or blocks) or divided into sub-modules (or sub-units or sub-blocks) despite their physical organization or storage.

It will be understood that when a unit, engine, module, or block is referred to as being "on," "connected to," or "coupled to" another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

The terminology used herein is for the purposes of describing particular examples and embodiments only and is not intended to be limiting. As used herein, the singular forms "a," "an," and "the" may be intended to include the plural forms as well, unless the context clearly indicates otherwise. It will be further understood that the terms "include" and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

In addition, it should be understood that in the description of the present disclosure, the terms "first", "second", or the like, are only used to distinguish the purpose of description, and cannot be interpreted as indicating or implying relative importance, nor can be understood as indicating or implying the order.

Conventionally, when a working server of a computing system is in an abnormal state, the working server may recover its operating system by restarting, or using a local storage device that stores a backup system of the working server. However, this conventional system recovery approach only works in some limited occasions. For example, the working server is able to recover its operating system if the abnormality is caused by abnormal software operation. The working server cannot recover its operating system if the abnormality is caused by a damage (e.g., a physical damage, or a damage by a malicious attack) or expiry of the working life of its system disk on which its operating system is running. As another example, when the local storage device that stores the backup system of the working server fails, the working server cannot recover its operating system using the local storage device. Thus, it may be desirable to develop efficient and feasible systems and methods for system recovery.

An aspect of the present disclosure relates to systems and methods for system recovery. The systems may at least one working server, a global storage device 120, and a management server connected to the at least one working server and the global storage device 120. The at least one working server may be configured to perform one or more tasks (e.g., computing tasks). The global storage device 120 may be configured to store a backup system or a system image file of each of the at least one working server. The management server may be configured to determine whether each of the at least one working server is in an abnormal state. In response to determining that a working server is in an abnormal state, the management server may be configured to assign at least part of the global storage device 120 to the working server and cause the working server to perform a first system recovery operation using the at least part of the global storage device 120. Different from the conventional system recovery approach, the systems and methods of the present disclosure may perform system recovery operation on the working server or the local storage device using a global storage device 120 that stores the backup system or the system image file of the working server. In this way, even if the system disk or the local storage device of the working server is damaged, the working server can also recover its operating system using the global storage device 120, thereby improving the system security and the system stability.

In some embodiments, the systems and methods for system recovery may be used to recover one or more components of a computing system. The computing system may include a cluster system, a distributed system, or the like, or any combination thereof. For illustration purposes, systems and methods for system recovery in a cluster system are described hereinafter. It should be noted that this is not intended to be limiting, and the systems and methods may be applied to other computing systems, such as a distributed system, etc.

Figure 1:
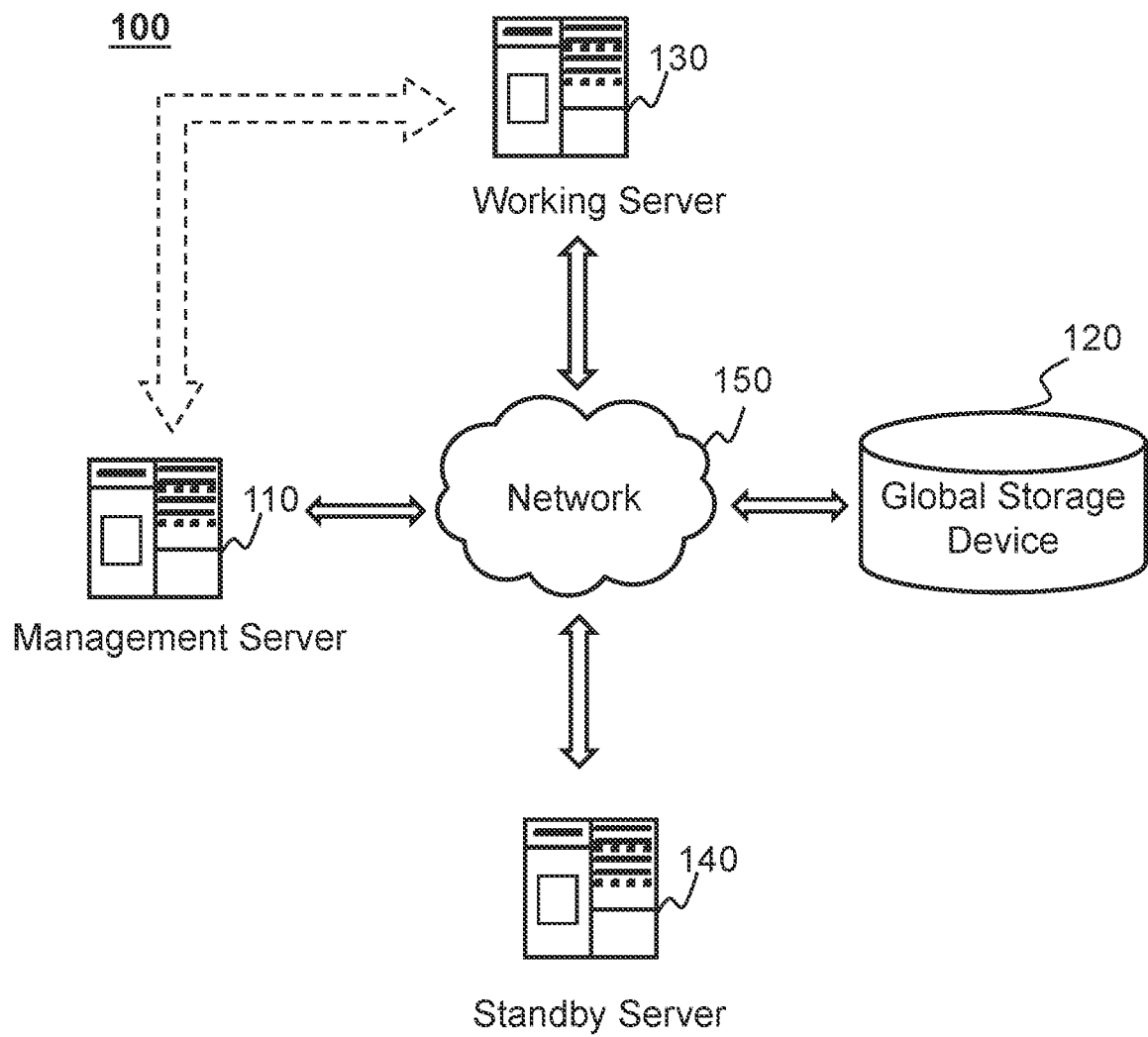
FIG. 1 is a schematic diagram illustrating an exemplary cluster system according to some embodiments of the present disclosure.

FIG. 1 is a schematic diagram illustrating an exemplary cluster system according to some embodiments of the present disclosure. As shown, a cluster system 100 may include a management server 110, a global storage device 120, a working server 130, a standby server 140, and a network 150. In some embodiments, two or more of the management server 110, the global storage device 120, the working server 130, and the standby server 140 may be connected each other via the network 150 or directly. For example, as shown in FIG. 1, the management server 110 may be connected to the working server 130 directly (denoted by a dotted arrow in FIG. 1) or through the network 150.

The management server 110 may be configured to monitor and/or manage one or more components (e.g., the global storage device 120, the working server 130, and/or the standby server 140) of the cluster system 100. Merely by way of example, the management server 110 may obtain data and/or information relating to the working server 130, such as identification information, status information, or the like, or any combination thereof. The management server 110 may manage the working server 130 according to the obtained data and/or information relating to the working server 130. For example, the management server 110 may determine whether the working server 130 is in an abnormal state. As another example, when the working server 130 is in an abnormal state, the management server 110 may direct the working server 130 to perform a system recovery operation using the global storage device 120 (or a portion thereof) or a local storage device of the working server 130. As used herein, an abnormal state of a server refers to a state in which the server cannot operate in accordance with a normal mode. For example, the server may crash when a computer program, such as a software application or an operating system of the server stops functioning properly and exits. As another example, the server can not work normally when a hard disk drive malfunctions.

The working server 130 may process information and/or data relating to the cluster system 100 to perform one or more tasks of the cluster system 100. For example, the working server 130 may be used to perform computational tasks to analyze data. As another example, the working server 130 may be used to process an instruction or data received from a user terminal.

The standby server 140 may replace the working server 130 to perform the task(s) of the cluster system 100 when, for example, the working server 130 is in an abnormal state.

For example, when the working server 130 is in an abnormal state, the standby server 140 may take over one or more tasks of the working server 130 and perform the task(s). In some embodiments, when the working server 130 is in a normal state, the standby server 140 may be configured to work as a working server and perform one or more other tasks of the cluster system 100. Alternatively, when the working server 130 is in a normal state, the standby server 140 may operate in a sleep state and be actuated if an abnormality of the working server 130 is detected. In some embodiments, the management server 110 may be configured to synchronize task(s), configuration information, or other information of the working server 130 and the standby server 140. When the working server 130 is in an abnormal state, the management server 110 may be configured to cause the standby server 140 to take over the task(s) of the working server 130.

In some embodiments, a server of the cluster system 100 (such as, the management server 110, the working server 130, and the standby server 140) may include one or more processing units (e.g., single-core processing device(s) or multi-core processing device(s)). Merely by way of example, the management server 110 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The server may be a single server or a server group. In some embodiments, the server may be local or remote. For example, the management server 110 may access information and/or data stored in the working server 130, and/or the global storage device 120 via the network 150. As another example, the management server 110 may be directly connected to the working server 130, and/or the global storage device 120 to access stored information and/or data. In some embodiments, the server may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the working server 130 may include a communication port for connecting to one or more other devices of the cluster system 100 or an external system. In some embodiments, the communication port may support data communication protocols, such as the Serial Attached SCSI (SAS) protocol, the Serial Advanced Technology Attachment (SATA) protocol, the Non-Volatile Memory Express (NVME) protocol, the Peripheral Component Interface Express (PCIE) protocol, or the like. In some embodiments, communication ports of different categories may be used by different servers.

The global storage device 120 refers to a storage device that can be jointly used by multiple devices, for example, multiple components of the cluster system 100 (e.g., the management server 110 and the working server 130). The global storage device 120 may store data and/or instructions. The data and/or instructions may be obtained from or used by, for example, the management server 110, the working server 130, and/or any other component of the cluster system 100. In some embodiments, the global storage device 120 may store data and/or instructions that the management server 110 may execute or use to perform exemplary methods described in the present disclosure. For example, the global storage device 120 may store a backup system or a system image file of the working server 130, which may be used to recover the working server 130 when the working server 130 is abnormal.

In some embodiments, the global storage device 120 may include a mass storage device, a removable storage device, a volatile read-and-write memory, a read-only memory (ROM), or the like, or any combination thereof. Exemplary mass storage devices may include a magnetic disk, an optical disk, solid-state drives, etc. Exemplary removable storage devices may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the global storage device 120 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the global storage device 120 may be connected to the network 150 to communicate with one or more components of the cluster system 100 (e.g., the management server 110, the working server 130). One or more components of the cluster system 100 may access the data or instructions stored in the global storage device 120 via the network 150. In some embodiments, the global storage device 120 may be directly connected to or communicate with one or more components of the cluster system 100 (e.g., the management server 110, the working server 130). In some embodiments, the global storage device 120 may be part of another component of the cluster system 100, such as the management server 110, or the working server 130.

In some embodiments, one or more components of the cluster system 100 (e.g., the management server 110, the working server 130) may have permission to access the global storage device 120 to read data stored in the global storage device 120. For example, the management server 110 or the working server 130 may obtain a backup system or a system image file stored in the global storage device 120. In some embodiments, one or more components of the cluster system 100 (e.g., the management server 110, the working server 130) may have permission to write data into the global storage device 120. In some embodiments, when the management server 110 and/or the working server 130 work normally, the global storage device 120 may be in a safe state under which the global storage device 120 is inaccessible to any other components (e.g., the management server 110, the working server 130, the standby server 140) of the cluster system 100.

In some embodiments, the management server 110, the global storage device 120, the working server 130, and the standby server 140 may form a storage area network (SAN). An SAN may be a network (e.g., a dedicated high-speed network) or subnetwork that provides multiple servers access to storage devices. In some embodiments, two or more of the management server 110, the global storage device 120, the working server 130, and the standby server 140 may be connected to each other via, such as, expanders, FC switches, etc., to form the SAN.

The network 150 may include any suitable network that can facilitate the exchange of information and/or data for the cluster system 100. In some embodiments, one or more components in the cluster system 100 (e.g., the management server 110, the global storage device 120, and the working server 130) may send information and/or data to another component(s) in the cluster system 100 via the network 150. In some embodiments, the network 150 may be any type of wired or wireless network, or a combination thereof. Merely by way of example, the network 150 may include a cable network (e.g., a coaxial cable network), a wireline network, an optical fiber network, a telecommunications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, different components of the cluster system 100 may be connected to each other via the same network or different networks. For example, the working server 130 and the standby server 140 may be connected via a LAN, and the management server 110 and the global storage device 120 may be connected via an optical fiber network.

In some embodiments, the cluster system 100 may further include a user terminal that enables user interactions between a user and one or more components of the cluster system 100. Exemplary terminal devices may include a mobile phone, a computer, a tablet computer, or the like. In some embodiments, the user terminal may be and/or include any suitable device that can display or output information in a human-readable form, such as text, image, audio, video, graph, animation, or the like, or any combination thereof. In some embodiments, the user may view information and/or input data and/or instructions via the user terminal. For example, the user may send a request to the working server 130 via the user terminal. The working server 130 may receive the request from the user terminal and perform operations in response to the request. The working server 130 may transmit a processing result to the user terminal and the user may view the processing result via a display device of the user terminal. As another example, the user may input an instruction to upload data via the user terminal. The uploaded data may be stored in the global storage device 120. The display device of the user terminal 140 may include a cathode ray tube (CRT) display, a liquid crystal display (LCD), a light emitting diode (LED) display, a plasma display panel (PDP), a 3D display, or the like. In some embodiments, the user terminal may be connected to one or more components of the cluster system 100 (e.g., the management server 110, the global storage device 120, the working server 130) via the network 150.

It should be noted that the above description is merely provided for the purposes of illustration, and not intended to limit the scope of the present disclosure. For persons having ordinary skills in the art, multiple variations and modifications may be made under the teachings of the present disclosure.

In some embodiments, the cluster system 100 may include one or more additional components. For example, a backup system or a system image file of the management server 110 may be stored in the global storage device 120. The cluster system 100 may include a standby management server. The standby management server may be configured to take over one or more tasks (e.g., managing the working server 130) of the management server 110 when the management server 110 is in an abnormal state. As another example, the cluster system 100 may further include a standby global storage device 120 that also stores the backup system or the system image file of the working server 130. When the global storage device 120 fails, the standby global storage device 120 may be used to perform the functions of the global storage device 120. In some embodiments, one or more components of the cluster system 100 described above may be omitted. For example, the network 150 may be omitted. The management server 110, the global storage device 120, the working server 130, and the standby server 140 may be connected via other manners, such as an SAN.

Additionally or alternatively, two or more components of the cluster system 100 may be integrated into a single component. A component of the cluster system 100 may be implemented on two or more sub-components. For example, the global storage device 120 may be integrated into the management server 110. As another example, two components of the cluster system 100 may be connected directly. However, those variations and modifications do not depart from the scope of the present disclosure.

In addition, although only one management server 110, one global storage device 120, one working server 130, and one standby server 140 are shown in FIG. 1, for convenience, the cluster system 100 may include multiple management servers 110, global storage devices 120, working servers 130, and standby servers 140, or any combination thereof. For example, the cluster system 100 may include a plurality of management servers 110 each of which manages different working servers 130 and/or standby server 140. As another example, the cluster system 100 may include a plurality of working servers 130 each of which corresponds one or more standby servers 140. As still another example, the cluster system 100 may include a plurality of global storage devices 120 each of which stores backup systems or system image files of one or more of the management servers 110, the working servers 130, and the standby servers 140.

FIG. 2 is a schematic diagram illustrating exemplary hardware and/or software components of a computing device according to some embodiments of the present disclosure. The computing device 200 may be used to implement any component (e.g., the management server 110, the working server 130, the standby server 140) of the cluster system 100 as described herein. For example, the management server 110 may be implemented on the computing device 200, via its hardware, software program, firmware, or a combination thereof. Although only one such computer is shown, for convenience, the computer functions relating to system recovery as described herein may be implemented in a distributed fashion on a number of similar platforms to distribute the processing load.

The computing device 200, for example, may include COM ports 250 connected to and from a network connected thereto to facilitate data communications. The computing device 200 may also include a processor (e.g., the processor 220), in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read-only memory (ROM) 230, or a random-access memory (RAM) 240, for various data files to be processed and/or transmitted by the computing device 200. The computing device 200 may also include program instructions stored in the ROM 230, RAM 240, and/or another type of non-transitory storage medium to be executed by the processor 220. The methods and/or processes of the present disclosure may be implemented as the program instructions. The computing device 200 may also include an I/O component 260, supporting input/output between the computer and other components. The computing device 200 may also receive programming and data via network communications.

Merely for illustration, only one processor is illustrated in FIG. 2. Multiple processors 220 are also contemplated; thus, operations and/or method steps performed by one processor 220 as described in the present disclosure may also be jointly or separately performed by the multiple processors. For example, if in the present disclosure the processor 220 of the computing device 200 executes both step A and step B, it should be understood that step A and step B may also be performed by two different processors 220 jointly or separately in the computing device 200 (e.g., a first processor executes step A and a second processor executes step B or the first and second processors jointly execute steps A and B).

Figure 3:
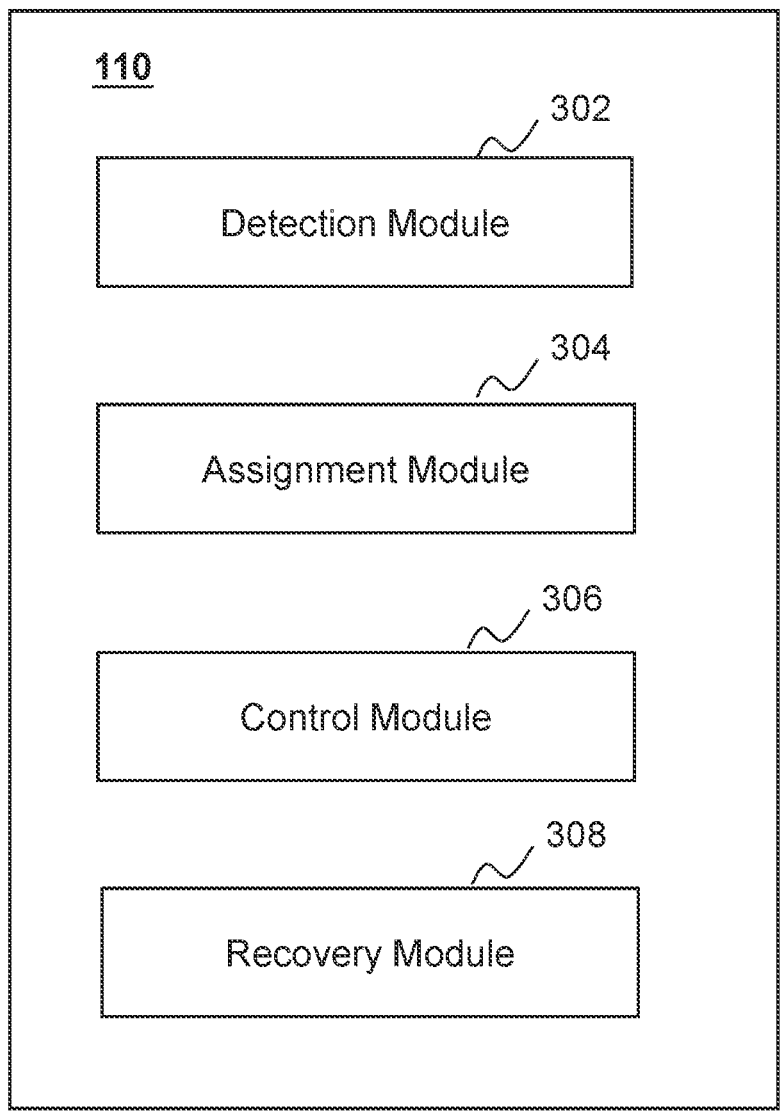
FIG. 3 is a block diagram illustrating exemplary management server 110 according to some embodiments of the present disclosure.

FIG. 3 is a block diagram illustrating exemplary management server 110 according to some embodiments of the present disclosure. As shown in FIG. 3, the management server 110 include a detection module 302, an assignment module 304, a control module 306, and a recovery module 308.

The detection module 302 may be configured to detect that a working server 130 is in an abnormal state. In some embodiments, the detection module 302 may be configured to monitor the status of the working server 130 and determine whether the working server 130 is in an abnormal state continuously or intermittently (e.g., periodically). More descriptions regarding the detection of an abnormal state of a working server 130 may be found elsewhere in the present disclosure. See, e.g., operation 505 in FIG. 5, and relevant descriptions thereof.

The assignment module 304 may be configured to assign at least part of the global storage device 120 to the working server 130 if the detection module 302 detects that the working server 130 is in an abnormal state. More descriptions regarding the assignment of at least part of the global storage device 120 may be found in the present disclosure. See, e.g., operation 510 in FIG. 5, and relevant descriptions thereof.

The control module 306 may be configured to cause the working server 130 to perform a first system recovery using a first local storage device of the working server 130. A local storage device of a working server refers to a storage device that can be only used by the working server. For example, the first local storage device may be connected to the working server 130 without connecting to other working servers of the cluster system 100.

In some embodiments, the detection module 302 may be configured to determine whether the first system recovery operation using the first local storage device is successful. In response to determining that the first system recovery operation using the first local storage device is successful, the control module 306 may be configured to cause the global storage device 120 to be in a safe state. In response to determining that the first system recovery operation using the first local storage device is not successful, the control module 306 may be configured to cause the working server 130 to perform the first system recovery using the at least part of the global storage device 120. More descriptions regarding the implementation of the first system recovery may be found elsewhere in the present disclosure. See, e.g., operations 520-550 in FIG. 5, and relevant descriptions thereof.

The recovery module 308 may be configured to recover the first local storage device based on the backup system or the system image file of the working server 130. For example, the management server 110 may recover the first local storage device by backing up the backup system or the system image file of the working server 130 from the global storage device 120 to the first local storage device.

In some embodiments, the detection module 302 may be configured to determine whether the first local storage device recovers successfully. In response to determining that the first local storage device recovers successfully, the control module 306 may be configured to cause the working server 130 to restart using the recovered first local storage device and cause the global storage device 120 to be in the safe state. In response to determining that the first local storage device does not recover successfully, the control module 306 may be configured to cause the working server 130 to keep operating using the at least part of the global storage device 120. More descriptions regarding the recovery of the first local storage device may be found elsewhere in the present disclosure. See, e.g., operations 560-590 in FIG. 5, and relevant descriptions thereof.

Figure 4:
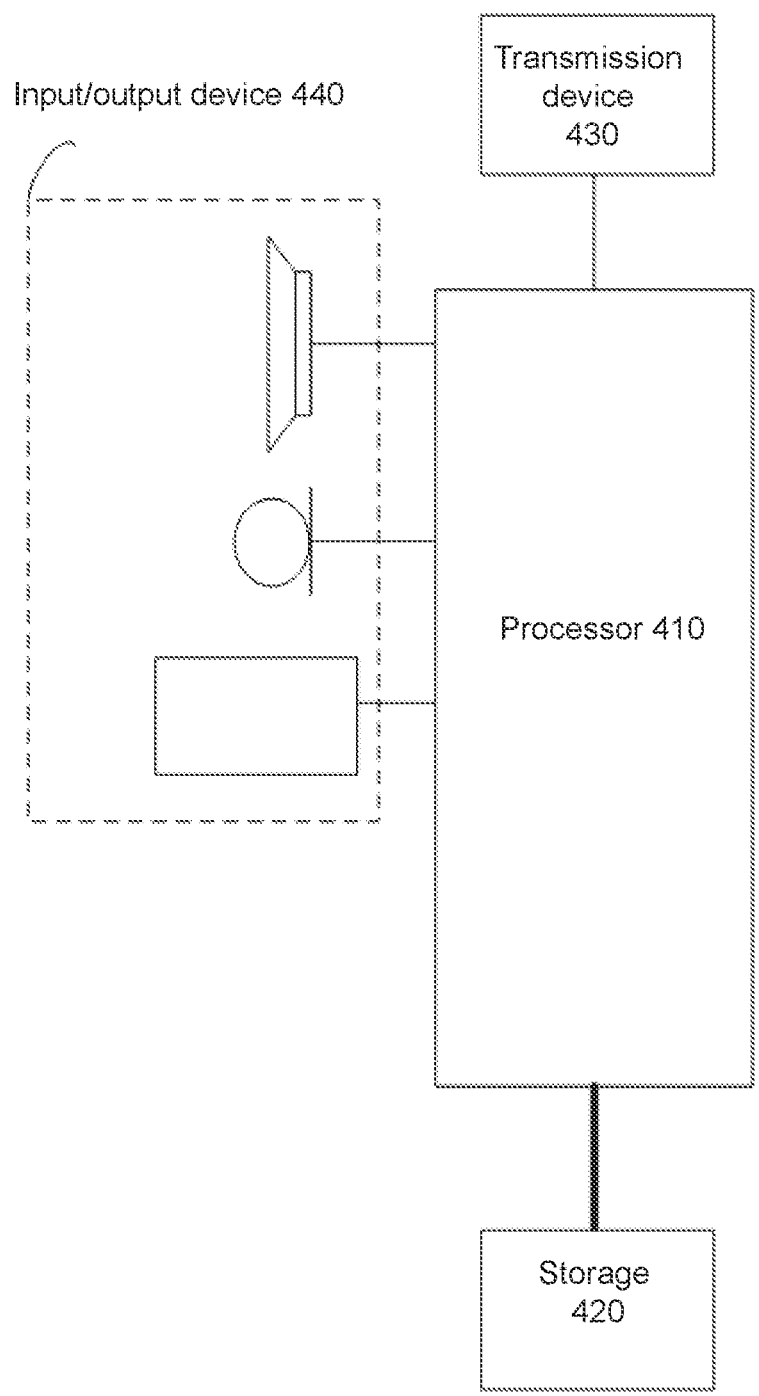
FIG. 4 is a schematic diagram illustrating an exemplary terminal device according to some embodiments of the present disclosure.

Systems and methods of the present disclosure may be implemented in a mobile terminal, a computer terminal, or a similar computing device. Taking the mobile terminal as an example, FIG. 4 is a schematic diagram illustrating an exemplary terminal device according to some embodiments of the present disclosure. As shown in FIG. 4, the mobile terminal 400 may include one or more processors 410 (only one processor is shown in FIG. 4 for convenience) and a storage 420 for storing data. The processor 410 may include but is not limited to a processing device such as a microprocessor unit (MCU) or a field programmable gate array (FPGA). Optionally, the mobile terminal 400 may also include a transmission device 430 for communication functions and an input/output device 440. One of the ordinary skills in the art would understand that the structure shown in FIG. 4 is merely illustrative and does not limit the structure of the mobile terminal 400. For example, the mobile terminal 400 may further include more or fewer components than those shown in FIG. 4, or have a different configuration from that shown in FIG. 4.

The storage 420 may be configured to store computer programs, such as software programs and modules for implementing software programs, for example, a computer program corresponding to a system recovery method in some embodiments of the present disclosure. The processor 410 may execute various function applications and data processing operations by running a computer program stored in the storage 420, that is, implementing the methods described herein. The storage 420 may include a high-speed random storage and a non-volatile storage, such as one or more magnetic storage devices, flash memory, or other non-volatile solid storages. In some embodiments, the storage 420 may further include a remote storage relative to the processor 410, which may be connected to the mobile terminal 400 via a network. Examples of the network include but are not limited to the Internet, an intranet, a local area network, a mobile communication network, or the like, or any combination thereof.

The transmission device 430 is configured to receive or transmit data via the network. For example, the network may include a wireless network provided by a communication provider of the mobile terminal 400. In some embodiments, the transmission device 430 may include a Network Interface Controller (NIC), which may be connected to other network devices through a base station so as to communicate with the network. In some embodiments, the transmission device 430 may include a Radio Frequency (RF) module for communicating with the Internet wirelessly.

Figure 5:
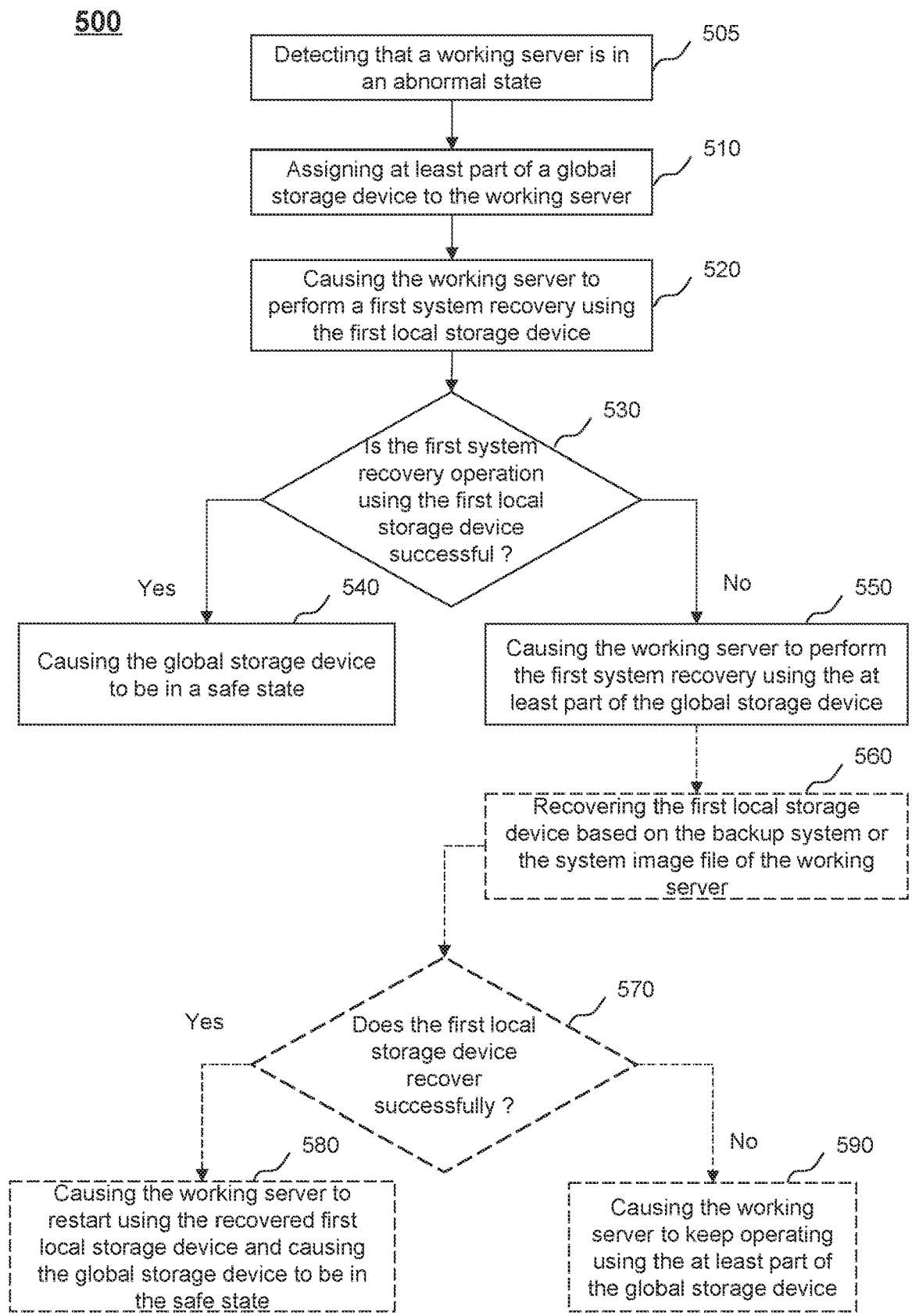
FIG. 5 is a flowchart illustrating an exemplary process for recovering a working server according to some embodiments of the present disclosure.

FIG. 5 is a flowchart illustrating an exemplary process for recovering a working server according to some embodiments of the present disclosure. In some embodiments, process 500 shown in FIG. 5 may be implemented in the cluster system 100 illustrated in FIG. 1. For example, at least a part of the process 500 may be stored in a storage device (e.g., a storage device of the management server 110) as a form of instructions, and invoked and/or executed by the management server 110. The operations of the illustrated process 500 presented below are intended to be illustrative. Additionally, the order in which the operations of the process 500 as illustrated in FIG. 5 and described below is not intended to be limiting.

In 505, the management server 110 (e.g., the detection module 302) may detect that a working server 130 is in an abnormal state.

In some embodiments, the management server 110 may be configured to monitor the status of the working server 130 and determine whether the working server 130 is in an abnormal state continuously or intermittently (e.g., periodically). For example, operation status information of the working server 130 may be transmitted to the management server 110 continuously or intermittently (e.g., periodically), and the management server 110 may determine whether the working server 130 is in an abnormal state based on the operation status information.

As another example, the management server 110 may send a heartbeat message to the working server 130, and determine that the working server 130 is in an abnormal state if no heartbeat response message is received from the working server 130 within a predetermined period (e.g., 100 million seconds, 0.5 seconds, 1 second, 5 seconds). As used herein, the heartbeat message may be used to determine an operating state of the working server 130, i.e., whether the working server 130 is working normally. The predetermined period may be set and/or adjusted according to an actual need.

In some embodiments, multiple heartbeat messages may be sent to the working server 130, and the management server 430 may determine the state of working server 130 according to the feedbacks regarding the heartbeat messages received from the working server 130. For example, if no heartbeat response message is received after N heartbeat messages are sent to the working server 130, the working server 130 may be determined to be abnormal. N may be any positive integer greater than 1, for example, N may be 2, 3, 4, etc. As another example, if a ratio of the count of the received heartbeat response messages to the count of the heartbeat messages is lower than a threshold, working server 130 may be determined to be abnormal. The threshold may be set as needed, for example, 60%, 80%, 90%.

In 510, the management server 110 (e.g., the assignment module 304) may assign at least part of the global storage device 120 to the working server 130.

In some embodiments, after the at least part of the global storage device 120 is assigned to the working server 130, the working server 130 may only have permission to read data stored in the at least part of the global storage device 120 but not have permission to write data into the at least part of the global storage device 120. Alternatively, after the at least part of the global storage device 120 is assigned to the working server 130, the working server 130 may have permission to read data stored in the at least part of the global storage device 120 and write data into the global storage device 120. In some embodiments, if the at least part of the global storage device 120 is assigned to the working server 130, other devices in the cluster system 100 may have permission or be forbidden to access the at least of the global storage device 120. For example, if the working server 130 only have the permission to read data stored in the at least part of the global storage device 120, other devices may also have permission to read data stored in the at least part of the global storage device 120.

In some embodiments, the management server 110 may assign the at least part of the global storage device 120 to the working server 130 based on the count of working servers 130 (or abnormal working servers 130) in the cluster system 100, a type of the operating system of the working server 130, the importance of the working server 130, the performance of the global storage device 120, or the like, or any combination thereof. For example, the working server 130 and other working servers of the cluster system 100 may use a same type of operating system, and the backup system or the system image file of the operating system may be stored in the global storage device 120. When the working server 130 and the other working servers are both abnormal, the management server 110 may assign the global storage device 120 to the working server 130 and the other working server simultaneously.

As another example, the global storage device 120 may include a plurality of global storage units, each of which is configured to store a backup system or the system image file of one specific type of operating system. The management server 110 may select a target global storage unit from the plurality of global storage units based on the operating system of the working server 130. For example, if the operating system of the working server 130 is a windows system, the management server 110 may select a target global storage unit that stores a backup system or a system image file of the windows system, and assign the selected target global storage unit to the working server 130.

As still another example, the management server 110 may determine the importance of the working server 130 and other abnormal working server(s) of the cluster system 100. The management server 110 may assign the global storage device 120 to the working server 130 first if the working server 130 has a higher importance than the other abnormal working server(s). The management server 110 may assign the global storage device 120 to the other abnormal working server(s) first if the working server 130 has a lower importance than the other abnormal working server(s).

As still another example, the global storage device 120 may include a plurality of global storage units with different performances. The plurality of global storage units may have different power consumptions, capacities, and access speeds (e.g., a reading speed, a writing speed). The management server 110 may select a target global storage unit with the best performance from the plurality of global storage units, and assign the target global storage unit to the working server 130. For example, a first global storage unit may include one or more mechanical hard disks, and a second global storage unit may include one or more solid state disks (SSDs). The management server 110 may select the second global storage unit as the target global storage unit because the second global storage unit has a faster access speed.

In some embodiments, the management server 110 may assign the at least part of the global storage device 120 to the working server 130 based on multiple factors, such as the performance of the plurality of global storage units and the importance of the working server 130. For example, the management server 110 may assign a target global storage unit with better performance to the working server 130 if the working server 130 has a higher importance compared with other abnormal working servers.

In 520, the management server 110 (e.g., the control module 306) may cause the working server 130 to perform a first system recovery using a first local storage device of the working server 130.

A local storage device of a working server refers to a storage device that can be only used by the working server. For example, the first local storage device may be connected to the working server 130 without connecting to other working servers of the cluster system 100. As another example, the first local storage device may be a part of the working server 130. The first local storage device may store the backup system or the system image file of the working server 130.

In some embodiments, the management server 110 may cause the working server 130 may restart using the backup system or the system image file of the working server 130 stored in the first local storage device, so as to perform the first system recovery. For example, the working server 130 may load the backup system into its memory and restart to restore its operating system. As another example, the working server 130 may load the system image file to load its operating system into its memory, and restart to restore its operating system.

In some embodiments, the working server 130 may be caused to perform the first system recovery using the first local storage device automatically. As used herein, the terms "automatic" and "automated" are used interchangeable referring to methods and systems that analyze information and generates results with little or no direct human intervention. For example, the working server 130 may automatically restart using the first local storage device based on automatic restart programs stored in the working server 130. In some embodiments, another device or a user may cause the working server 130 to perform the first system recovery using the first local storage device. For example, a user may trigger a power switch of the working server 130 to cause the working server 130 to perform the first system recovery using the first local storage device. As yet another example, another device, such as, an external device may cause the working server 130 to perform the first system recovery using the first local storage device via a communication port of the working server 130.

In 530, the management server 110 (e.g., the detection module 302) may determine whether the first system recovery operation using the first local storage device is successful (i.e., whether the working server 130 is still in the abnormal state).

For example, after the first system recovery operation is completed, the management server 110 may send a heartbeat message to the working server 130, and determine whether the first system recovery operation using the first local storage device is successful based on feedbacks of the heartbeat message received from the working server 130. More descriptions for the determination of whether the working server is in an abnormal state may be found elsewhere in the present disclosure. See, operation 505 and relevant descriptions thereof.

In response to determining that the first system recovery operation using the first local storage device is successful, operation 540 may be performed. In some embodiments, after the first system recovery operation using the first local storage device is successful, the management server 110 may determine whether other working servers in the cluster system 100 are in an abnormal state. In response to determining that no working server in the cluster system 100 is in an abnormal state, operation 540 may be performed.

In response to determining that the first system recovery operation using the first local storage device is not successful, operation 550 may be performed.

In 540, the management server 110 (e.g., the control module 306) may cause the global storage device 120 to be in a safe state.

When the global storage device 120 is in a safe state, the working server 130 and optionally other devices (e.g., the management server 110, other working servers) of the cluster system 100 may not be allowed to access the global storage device 120. In some embodiments, after the first system recovery operation using the first local storage device is successful, the management server 110 and the working server 130 may automatically stop accessing the global storage device 120. In some embodiments, operation 540 may be omitted.

In 550, the management server 110 (e.g., the control module 306) may cause the working server 130 to perform the first system recovery using the at least part of the global storage device 120.

In some embodiments, the working server 130 may perform the first system recovery based on the backup system of the working server stored in the at least part of the global storage device 120. For example, the working server 130 may load the backup system into its memory from the at least part of the global storage device 120 and restart to restore its operating system.

In some embodiments, the working server 130 may perform the first system recovery based on the system image file of the working server 130 stored in the at least part of the global storage device 120. For example, the working server 130 may load the system image file to load its operating system into its memory, and restart via a network to restore its operating system.

In some embodiments, process 500 may terminate after operation 550 is performed. In some embodiments, process 500 may further include at least some of operations 560-590 as shown in FIG. 5.

In 560, the management server 110 (e.g., the recovery module 308) may recover the first local storage device based on the backup system or the system image file of the working server 130.

For example, the management server 110 may recover the first local storage device by backing up the backup system or the system image file of the working server 130 from the global storage device 120 to the first local storage device.

In some embodiments, the recovered working server 130 may back up its operating system from its memory to the first local storage device automatically or under the direction of another device (e.g., the management server 110, an external device, etc.).

In 570, the management server 110 (e.g., the detection module 302) may determine whether the first local storage device recovers successfully.

In response to determining that the first local storage device recovers successfully, operation 580 may be performed. In response to determining that the first local storage device does not recover successfully, operation 590 may be performed.

In 580, the management server 110 (e.g., the control module 306) may cause the working server 130 to restart using the recovered first local storage device and cause the global storage device 120 to be in the safe state.

In some embodiments, the management server 110 may send a prompt message indicating that the first local storage device has been recovered successfully to the working server 130. After the working server 130 receives the prompt message, the working server 130 may automatically stop accessing the global storage device 120 and restart using the recovered first local storage device. In some embodiments, the management server 110 may send an instruction to the working server 130 to direct the working server 130 to restart using the recovered first local storage device. In some embodiments, another device connected with the first local storage device may detect that the first local storage device recovers successfully, and cause the working server 130 to restart using the recovered first local storage device.

In some embodiments, if the first local storage device recovers successfully, the management server 110 may cause the global storage device 120 to be in the safe state. Alternatively, the management server 110 may cause the global storage device 120 to be in the safe state after the working server 130 has successfully restarted using the recovered first local storage device. More descriptions regarding causing the global storage device 120 to be in a safe state may be found elsewhere in the present disclosure. See, e.g., operation 540 and relevant descriptions thereof.

In 590, the management server 110 (e.g., the control module 306) may cause the working server 130 to keep operating using the at least part of the global storage device 120.

In some embodiments, in response to determining that the first local storage device does not recover successfully, the management server 110 may remind a user to replace the first local storage device. For example, the management server 110 may send a reminder message indicating that the first local storage device needs to be replaced to a user terminal. As another example, the management server 110 may generate alarm information (e.g., an alarm audio) to remind the user to replace the first local storage device.

Conventionally, when a working server of a computing system is in an abnormal state, the working server may recover its operating system by restarting, or using a local storage device that stores a backup system of the working server. However, this conventional system recovery approach only works in some limited occasions. For example, the working server is able to recover its operating system if the abnormality is caused by abnormal software operation. The working server cannot recover its operating system if the abnormality is caused by a damage (e.g., a physical damage, or a damage by a malicious attack) or expiry of the working life of its system disk on which the operating system is running. As another example, when the local storage device that stores the backup system of the system malfunctions, the working server cannot recover its operating system using the local storage device.

Different from the conventional system recovery approach, the systems and methods of the present disclosure may perform system recovery operation on the working server or the local storage device using a global storage device 120 that stores the backup system or the system image file of the working server. In this way, even if the system disk or the local storage device of the working server are damaged, its operating system may also recover using the global storage device 120, thereby improving the system security and the system stability.

In some embodiments, the system recovery process of the standby server 140 may be performed in a similar manner as the process 500.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the process 500 may be accomplished with one or more additional operations not described and/or without one or more of the operations discussed above. For example, the process 500 may include an additional operation added after 505, in which the management server 110 may cause a standby server corresponding to the working server 130 to take over one or more tasks of the working server 130. After the first system recovery operation is performed successfully (e.g., after operation 550 or 540 is performed), the management server 110 may cause the working server 130 to take over the current task(s) from the standby server. In some embodiments, two or more operations may be performed simultaneously. For example, operations 550 and 560 may be performed simultaneously.

Figure 6:
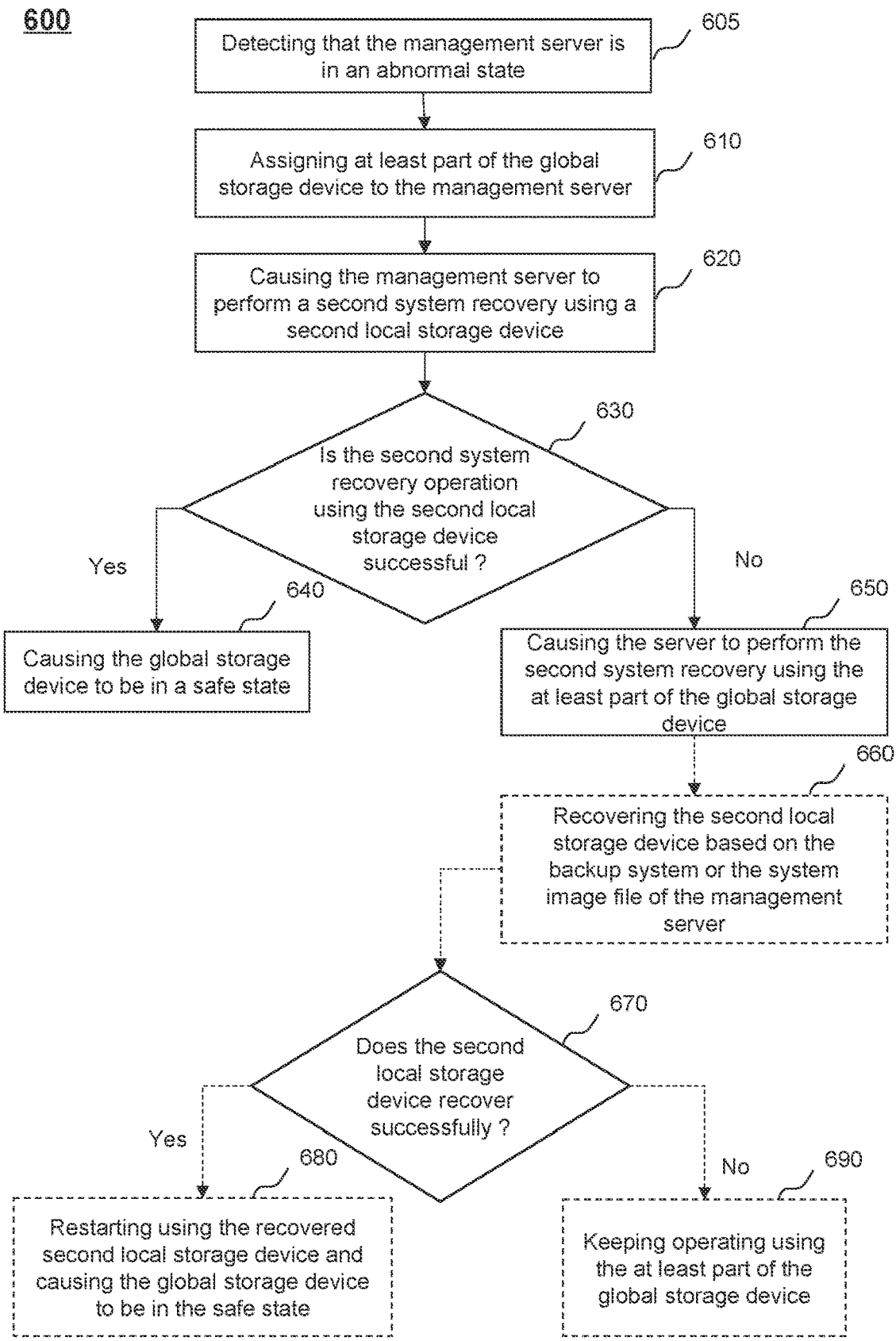
FIG. 6 is a flowchart illustrating an exemplary process for recovering a management server according to some embodiments of the present disclosure.

FIG. 6 is a flowchart illustrating an exemplary process for recovering a management server according to some embodiments of the present disclosure. In some embodiments, the process 600 shown in FIG. 6 may be implemented in the cluster system 100 illustrated in FIG. 1. For example, at least a part of the process 600 may be stored in a storage as a form of instructions, and invoked and/or executed by a standby management server. The operations of the illustrated process 600 presented below are intended to be illustrative. Additionally, the order in which the operations of the process 600 as illustrated in FIG. 6 and described below is not intended to be limiting.

In some embodiments, the system recovery of the management server 110 may be performed in a similar manner as the system recovery of the working server 130 as described elsewhere in this disclosure (e.g., FIG. 5).

In 605, the standby management server may detect that the management server 110 is in an abnormal state. Operation 605 may be performed in a similar manner as operation 505, and the descriptions thereof are not repeated here.

In 610, the standby management server may assign at least part of the global storage device 120 to the management server 110. Operation 610 may be performed in a similar manner as operation 510, and the descriptions thereof are not repeated here.

In 620, the standby management server may cause the management server 110 to perform a second system recovery using a second local storage device.

The second local storage device refers to a storage device that can be only used by the management server 110. For example, the second local storage device may be connected to the management server 110 without connecting to other devices of the cluster system 100. As another example, the second local storage device may be a part of the management server 110. The second local storage device may store a backup system or a system image file of the management server 110. Operation 620 may be performed in a similar manner as operation 520, and the descriptions thereof are not repeated here.

In 630, the standby management server may determine whether the second system recovery operation using the second local storage device is successful (i.e., whether the management server 110 is still in the abnormal state). Operation 630 may be performed in a similar manner as operation 530, and the descriptions thereof are not repeated here.

In response to determining that the second system recovery operation using the second local storage device is successful, operation 640 may be performed. In response to determining that the second system recovery operation using the second local storage device is not successful, operation 650 may be performed.

In 640, the standby management server may cause the global storage device 120 to be in a safe state.

In some embodiments, after the second system recovery operation using the second local storage device is successful, the standby management server and the management server 110 may automatically stop accessing the global storage device 120. In some embodiments, operation 640 may be omitted.

In 650, the standby management server may cause the management server 110 to perform the second system recovery using the at least part of the global storage device 120.

Operation 650 may be performed in a similar manner as operation 550, and the descriptions thereof are not repeated here.

In some embodiments, after the second system recovery operation is successful (e.g., after operation 650 or operation 640 is performed), an additional operation may be added. Specifically, the management server 110 may perform its function and the standby management server may stop performing task(s) of the management server 110.

In some embodiments, the process 600 may terminate after operation 650 is performed. In some embodiments, process 600 may further include at least some of operations 660-690 as shown in FIG. 6.

In 660, the management server 110 (e.g., the recovery module 308) may recover the second local storage device based on the backup system or the system image file of the management server 110. Operation 660 may be performed in a similar manner as operation 560, and the descriptions thereof are not repeated here.

In 670, the management server 110 (e.g., the detection module 302) may determine wherever the second local storage device recovers successfully. In response to determining that the second local storage device recovers successfully, operation 680 may be performed. In response to determining that the second local storage device does not recover successfully, operation 690 may be performed.

In 680, the management server 110 (e.g., the control module 306) may restart using the recovered second local storage device and cause the global storage device 120 to be in the safe state.

In some embodiments, the management server 110 may automatically stop accessing the global storage device 120 and restart using the recovered second local storage device. In some embodiments, another device connected with the second local storage device may detect that the second local storage device recovers successfully, and cause the management server 110 to restart using the recovered second local storage device.

In some embodiments, if the second local storage device recovers successfully, the management server 110 may cause the global storage device 120 to be in the safe state. Alternatively, the management server 110 may cause the global storage device 120 to be in the safe state after the management server 110 has successfully restarted using the recovered second local storage device. More descriptions regarding causing the global storage device 120 to be in the safe state may be found elsewhere in the present disclosure. See, e.g., operation 640 and relevant descriptions thereof.

In 690, the management server 110 (e.g., the control module 306) may keep operating using the at least part of the global storage device 120.

In some embodiments, in response to determining that the second local storage device does not recover successfully, the management server 110 may remind a user to replace the second local storage device. For example, the management server 110 may send a reminder message indicating that the second local storage device needs to be replaced to a user terminal. As another example, the management server 110 may generate alarm information (e.g., an alarm audio) to remind the user to replace the second local storage device.

Figure 7:
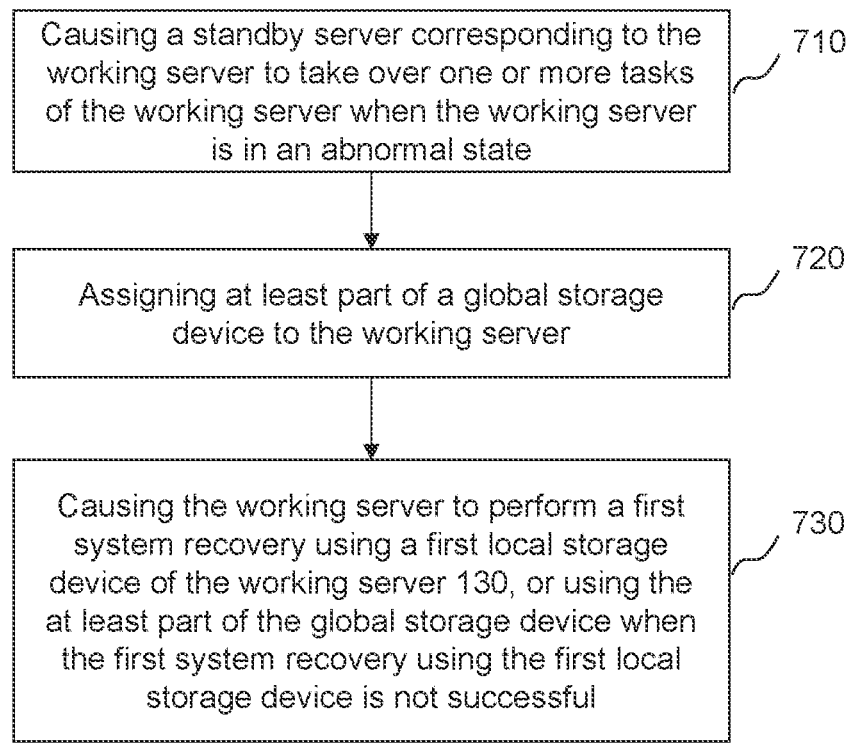
FIG. 7 is a flowchart illustrating an exemplary process for recovering a working server in a cluster system according to some embodiments of the present disclosure.

FIG. 7 is a flowchart illustrating an exemplary process for recovering a working server in a cluster system according to some embodiments of the present disclosure. In some embodiments, the process 700 shown in FIG. 7 may be implemented in the cluster system 100 illustrated in FIG. 1. For example, at least a part of the process 700 may be stored in a storage as a form of instructions, and invoked and/or executed by the management server 110. The operations of the illustrated process 700 presented below are intended to be illustrative. Additionally, the order in which the operations of the process 700 as illustrated in FIG. 7 and described below is not intended to be limiting.

In 710, the management server 110 may cause a standby server corresponding to the working server 130 to take over one or more tasks of the working server 130 when the working server 130 is in an abnormal state.

In 720, the management server 110 may assign at least part of a global storage device 120 to the working server 130.

In some embodiments, the management server 110 may obtain a target password for verifying the global storage device 120. If the target password matches a pre-stored password, the management server 110 may assign the at least part of the global storage device 120 to the working server 130.

In 730, the management server 110 may cause the working server 130 to perform a first system recovery using a first local storage device of the working server 130, or using the at least part of the global storage device 120 to perform the first system recovery when the first system recovery using the first local storage device is not successful.

In the process 700, the management server 110 may detect that the working server 130 is in an abnormal state, assign at least part of the global storage device 120 to the working server 130, and cause a standby server corresponding to the working server 130 to take over one or more tasks of the working server 130 and a hard disk array connected to the working server 130. The management server 110 may cause the working server 130 to perform the first system recovery using the first local storage device of the working server 130, or using the at least part of the global storage device 120 when the first system recovery using the first local storage device is not successful. Systems and methods of the present disclosure may recover the operating system of any working server in the cluster system if the abnormality is caused by a damage (e.g., a physical damage, or a damage by a malicious attack) or expiry of the working life of system disk on which its operating system is running, which may improve the safety and availability of each working server in the cluster system to ensure a long-term stable operation of the cluster system.

In some embodiments, after the working server 130 performs the first system recovery using the first local storage device or using the at least part of the global storage device 120, the management server 110 may determine whether the first system recovery operation is successfully performed using the first local storage device or the at least part of the global storage device 120. In response to determining that the first system recovery operation is successfully performed using the first local storage device, the management server 110 may cause the global storage device 120 to be in a safe state. In response to determining that the first system recovery operation is successfully performed using the at least part of the global storage device 120, the working server 130 may back up the backup system of the working server 130 from the at least part of the global storage device 120 to the first local storage device.

In some embodiments, the management server 110 may determine whether the backup system is backed up successfully. In response to determining that the backup system is not backed up successfully, the management server 110 may cause the working server 130 to keep operating using the at least part of the global storage device 120. In response to determining that the backup system is backed up successfully, the management server 110 may cause the working server 130 to restart using the recovered first local storage device and cause the global storage device 120 to be in the safe state.

In some embodiments, after the working server 130 performs the first system recovery using the first local storage device or the at least part of the global storage device 120 local storage device, the management server 110 may cause the working server 130 to return to the normal state, and the standby server to return to the ready state.

In some embodiments, after the working server 130 returns to the normal state and the standby server returns to the ready state, the management server 110 may detect that the standby server is in an abnormal state. The management server 110 may assign at least part of a global storage device 120 to the standby server. The management server 110 may cause the standby server to perform a third system recovery using a third local storage device of the standby server, or using the at least part of the global storage device 120 to perform the third system recovery when the third system recovery using the first local storage device is not successful.

Figure 8:
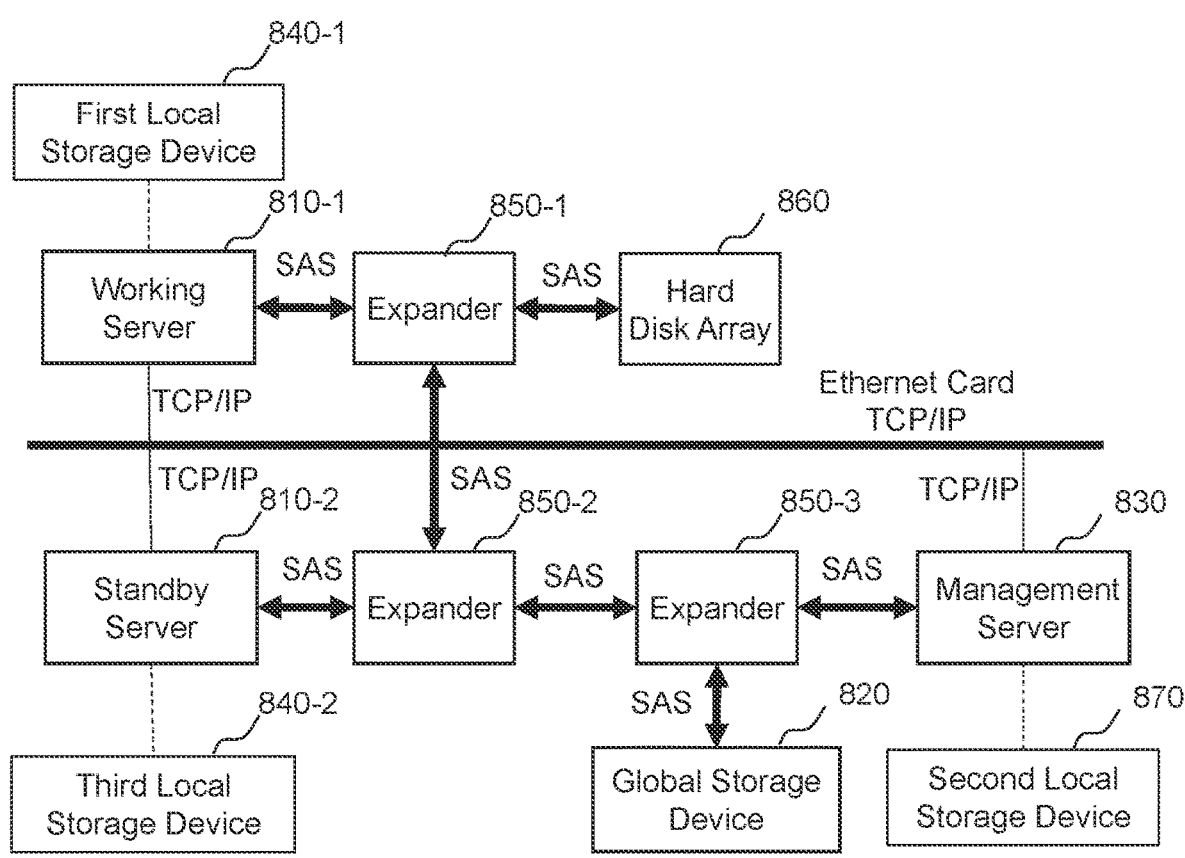
FIG. 8 is a schematic diagram illustrating an exemplary cluster system 800 according to some embodiments of the present disclosure.

FIG. 8 is a schematic diagram illustrating an exemplary cluster system 800 according to some embodiments of the present disclosure. As shown in FIG. 8, the cluster system 800 may include a working server 810-1, a standby server 810-2, a global storage device 120 820, and a management server 830.

The working server 810-1, the standby server 810-2, and the management server 830 are connected and communicated each other by an ethernet card using a TCP/IP protocol. The working server 810-1, the standby server 810-2, and the management server 830 are connected with a first local storage device 840-1, a third local storage device 840-2, and a second local storage device 870, respectively. An expander 850-1 is connected to the working server 810-1, a hard disk array 860, and an expander 850-2 via wide ports using SAS protocols. The expander 850-2 is connected to the standby server 810-2, the expander 850-1, and an expander 850-3 via wide ports using SAS protocols. The expander 850-3 is connected to the management server 830, the global storage device 120 820, and the expander 850-2 via wide ports using SAS protocols. The expander 850-1, the expander 850-2, and the expander 850-3 support SAS ZONE function. The cluster system 800 forms a storage system domain (e.g., an SAN described in FIG. 1). The working server 810-1, the standby server 810-2, and the management server 830 may access any storage device (e.g., the global storage device 120 820) in the storage system domain through the SAS ZONE function.

The working server 810-1 may be configured to perform one or more tasks of the cluster system 800. The standby server 810-2 may be a replacement device of the working server 810-1. When the working server 810-1 is in an abnormal state, the standby server 810-2 may take over the task(s) of the working server 810-1 until the working server 810-1 returns to a normal state.

The global storage device 120 820 may be configured to store backup systems of the working server 810-1 and the standby server 810-2. If the operating systems of the working server 810-1 and the standby server 810-2 are different, the global storage device 120 820 may be include a plurality of global storage device 120s each of which stores a backup system of one of the working server 810-1 and the standby server 810-2.

The management server 830 may be configured to manage one or more components (e.g., the working server 810-1, the standby server 810-2, the global storage device 120 820, etc.) of the cluster system 800. In some embodiments, the management server 830 may be configured to monitor the running status and tasks of the working server 810-1 and the standby server 810-2, and synchronize information (e.g., the tasks and configuration information) of the working server 810-1 and the standby server 810-2. In some embodiments, the management server 830 may be configured to assign the global storage device 120 820 to the working server 810-1 and the standby server 810-2 to perform a first system recovery operation.

When the cluster system 800 operates normally, the working server 810-1, the standby server 810-2, and the management server 830 are working normally and the global storage device 120 320 may be a safe state under which the global storage device 120 is inaccessible to any other components (e.g., the working server 810-1, the standby server 810-2, and the management server 830) in the cluster system 800.

If the management server 830 detects that the working server 810-1 is in an abnormal state, the management server 830 may assign the global storage device 120 820 to the working server 810-1 by performing SAS ZONE configuration using various safe manners (e.g., a password verification). As used herein, SAS ZONE configuration can be used to configure a server (e.g., the working server 810-1) to access one or more specific storage devices (e.g., the global storage device 120 or 820). The management server 830 may cause the working server 810-1 to perform a first system recovery via a basic input output system (BIOS) using the first local storage device 840-1. If the first system recovery operation using the first local storage device 840-1 is not successful, the management server 830 may cause the working server 810-1 to perform the first system recovery using the global storage device 120 820. The standby server 810-2 may take over the hard disk array 860 and the task(s) of the working server 810-1.

The working server 810-1 may be caused to perform the first system recovery. If the first system recovery is performed using the global storage device 120 820, the management server 830 may back up the backup system of the working server 810-1 from the global storage device 120 820 to the first local storage device 840-1, so as to recover the first local storage device 840-1. If the first local storage device 840-1 recovers successfully, the management server 830 may cause the working server 810-1 to restart using the recovered first local storage device 840-1 and cause the global storage device 120 820 to be in the safe state by performing the SAS ZONE configuration. If the first local storage device 840-1 does not recover successfully, the management server 830 may cause the working server 810-1 to keep operating using the global storage device 120 820. If the first system recovery is performed using the first local storage device 840-1, the management server 830 may cause the global storage device 120 820 to be in the safe state.

After the working server 810-1 recovers successfully, the management server 830 may synchronize the current task(s) of the standby server 810-2 to the working server 810-1, and return the hard disk array 860 to the working server 810-1 by performing the SAS ZONE configuration. The working server 810-1 may return to the normal state, and the standby server 810-2 may return to the ready state. The cluster system 800 may operate stably and reliably.

In some embodiments, the systems and methods of the present disclosure may be also applicable to a cluster system with multiple working servers and multiple standby servers. One or more servers being abnormal states may recover using the systems and methods of the present disclosure.

Figure 9:
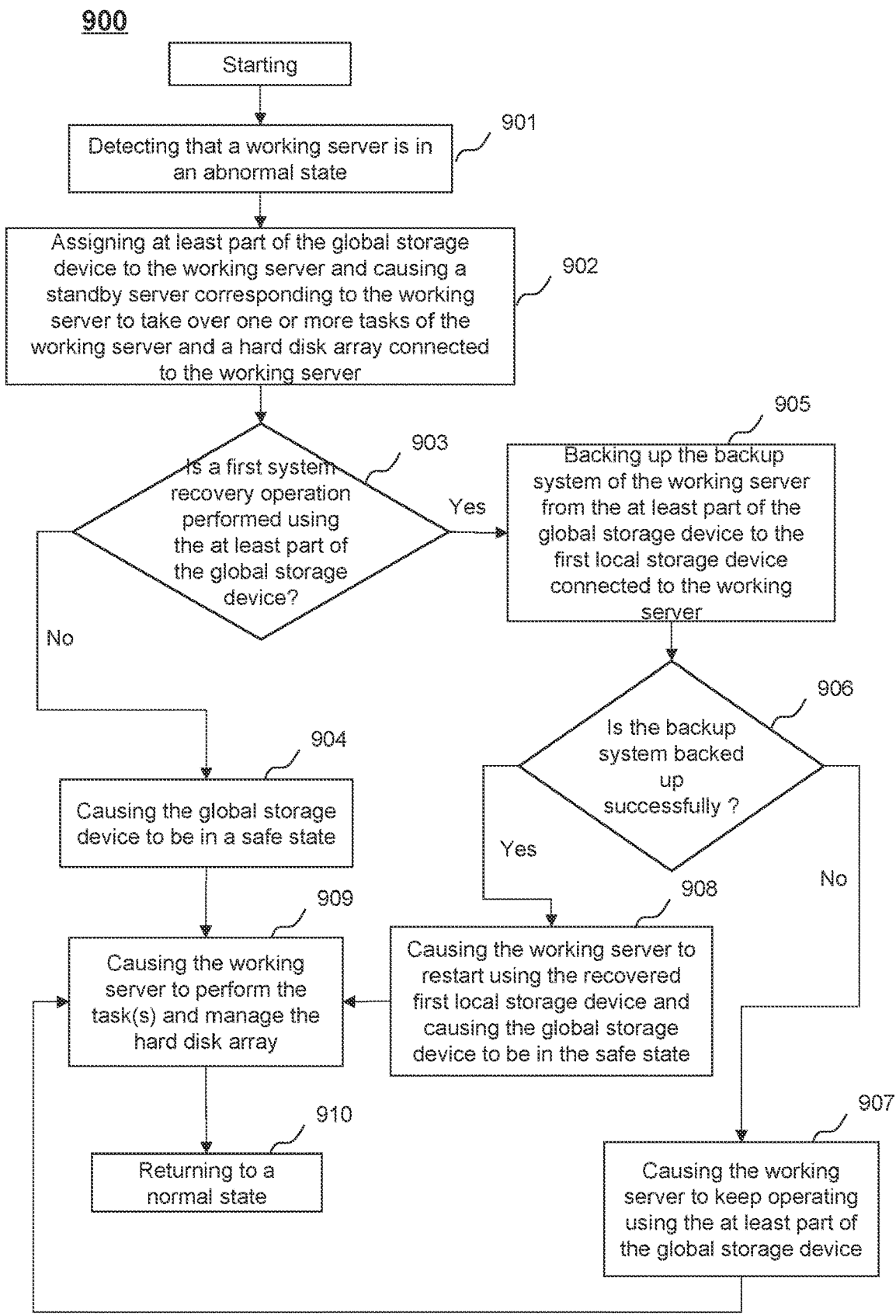
FIG. 9 is a flowchart illustrating an exemplary process for recovering a working server 130 according to some embodiments of the present disclosure.

FIG. 9 is a flowchart illustrating an exemplary process for recovering a working server 130 according to some embodiments of the present disclosure.

In 901, the management server 110 may detect that the working server 130 is in an abnormal state.

In 902, the management server 110 may assign at least part of the global storage device 120 to the working server 130 and cause a standby server corresponding to the working server 130 to take over one or more tasks of the working server 130 and a hard disk array connected to the working server 130.

In 903, the management server 110 may determine whether a first system recovery operation is performed using the at least part of the global storage device 120. In response to determining that the first system recovery operation is not performed using the at least part of the global storage device 120, operation 904 may be performed. In response to determining that the first system recovery operation is performed using the at least part of the global storage device 120, operation 905 may be performed.

In 904, the management server 110 may cause the global storage device 120 to be in a safe state.

In 905, the working server 130 may back up the backup system of the working server 130 from the at least part of the global storage device 120 to the first local storage device connected to the working server 130.

In 906, the management server 110 may determine whether the backup system is backed up successfully. In response to determining that the backup system is not backed up successfully, operation 907 may be performed. In response to determining that the backup system is backed up successfully, operation 908 may be performed.

In 907, the management server 110 may cause the working server 130 to keep operating using the at least part of the global storage device 120.

In 908, the management server 110 may cause the working server 130 to restart using the recovered first local storage device and cause the global storage device 120 to be in the safe state.

In 909, the management server 110 may cause the working server 130 to perform the task(s) and manage the hard disk array.

In 910, the working server 130 may return to a normal state.

Figure 10:
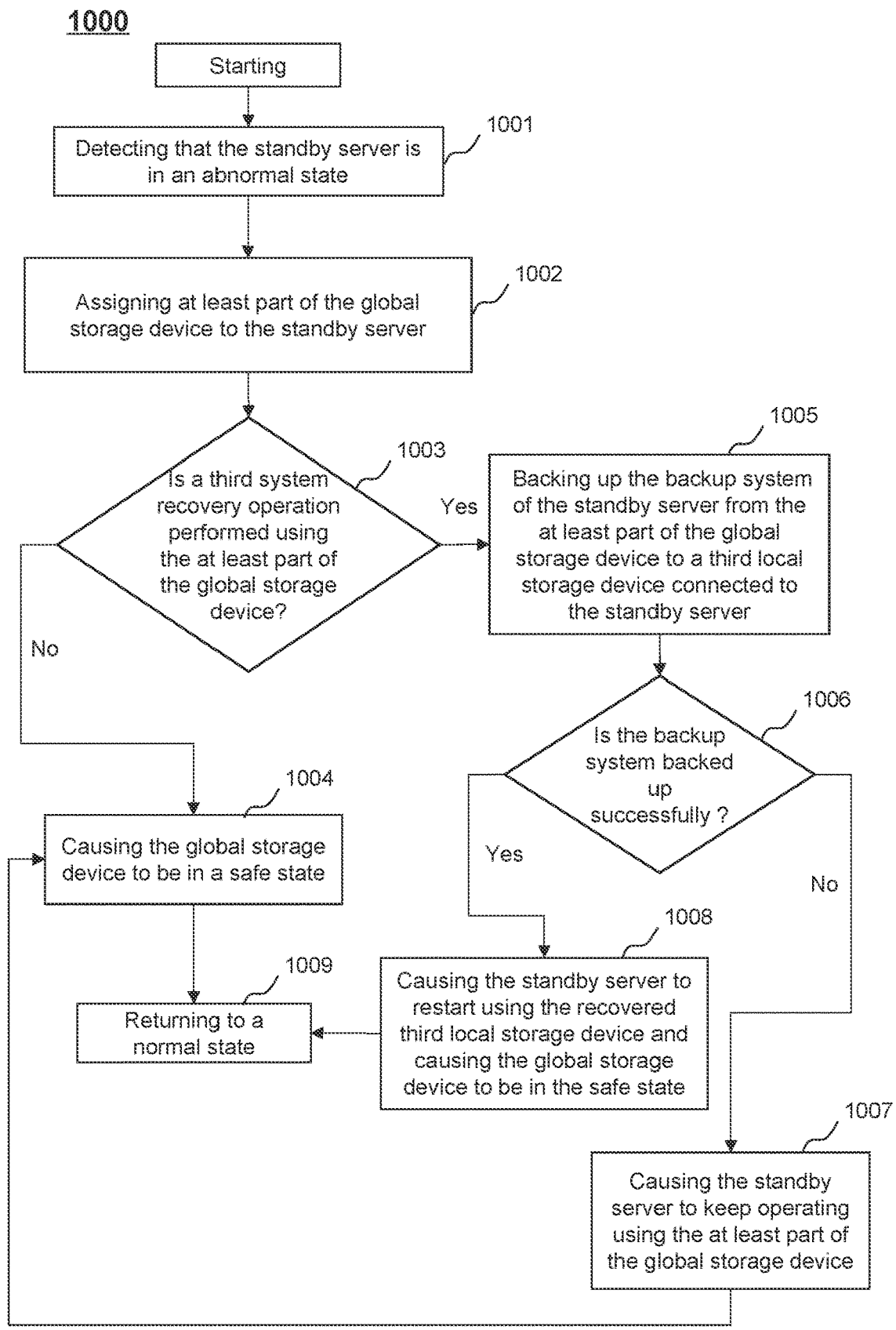
FIG. 10 is a flowchart illustrating an exemplary process for recovering a standby server according to some embodiments of the present disclosure.

FIG. 10 is a flowchart illustrating an exemplary process for recovering a standby server according to some embodiments of the present disclosure.

In 1001, the management server 110 may detect that the standby server 140 is in an abnormal state.

In 1002, the management server 110 may assign at least part of the global storage device 120 to the standby server 140.

In 1003, the management server 110 may determine whether a third system recovery operation is performed using the at least part of the global storage device 120. In response to determining that the third system recovery operation is not performed using the at least part of the global storage device 120, operation 1004 may be performed. In response to determining that the third system recovery operation is performed using the at least part of the global storage device 120, operation 1005 may be performed.

In 1004, the management server 110 may cause the global storage 120 device to be in a safe state.

In 1005, the standby server 140 may back up the backup system of the standby server 140 from the at least part of the global storage device 120 to a third local storage device connected to the standby server 140.

In 1006, the management server 110 may determine whether the backup system is backed up successfully. In response to determining that the backup system is not backed up successfully, operation 1007 may be performed. In response to determining that the backup system is backed up successfully, operation 1008 may be performed.

In 1007, the management server 110 may cause the standby server 140 to keep operating using the at least part of the global storage device 120.

In 1008, the management server 110 may cause the standby server 140 to restart using the recovered third local storage device and cause the global storage device 120 to be in the safe state.

In 1009, the standby server 140 may return to a normal state.

According to some embodiments of the present disclosure, the working server 130, the standby server 140, the global storage device 120, and the management server 110 may be connected via wide ports using SAS protocols to form a storage system domain. When the working server 130 and/or the standby server 140 are in the abnormal state caused by abnormal software operation, a damage (e.g., a physical damage, or a damage by a malicious attack) or expiry of the working life of the system disk on which the operating system is running, etc., the management server 110 may assign at least part of the global storage device 120 to the abnormal working server or the abnormal standby server 140 by performing the SAS ZONE configuration. The management server 110 may determine whether a system recovery operation is performed using the at least part of the global storage device 120, so as to determine whether the first local storage device connected to the abnormal working server or the third local storage device connected to the abnormal standby server 140 is abnormal. The management server 110 may further determine whether the first local storage device or the third local storage device needs to recover and cause the global storage device 120 to be in the safe state.

When the system operates normally, the global storage device 120 is in the safe state under which the global storage device 120 is inaccessible to any other components in the system. When a working server is in the abnormal state, the management server 110 may assign the global storage device 120 to the abnormal working server by performing the SAS ZONE configuration using various safe manners (e.g., a password verification).

In some embodiments, the systems and methods of the present disclosure may be implemented in a dual-control storage system. The global storage device 120 may be connected to the dual-control storage system via a bus using SAS protocols, SATA protocols, etc., and used to recover the dual-control storage system.

In some embodiments, the global storage device 120 may include a storage device that stores the backup system or the system image file of the working server 130, a storage device that stores the backup system or the system image file of the standby server 140, a storage device that stores the backup system or the system image file of the management server 110, or the like, or any combination thereof. In some embodiments, the first local storage device, the second local storage device, the third local storage device, and the global storage device 120 may include non-volatile storage media, such as hard disks, magnetic disks, or optical disks. The bus interfaces may include an SATA interface, an SAS interface, or the like.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer-readable program code embodied thereon.

A computer readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in a combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for system recovery, comprising:
at least one working server configured to perform one or more tasks;
a global storage device configured to store a backup system or a system image file of each of the at least one working server, wherein
in response to determining that a cluster system operates normally, the global storage device is a safe state under which the global storage device is inaccessible to any other components in the cluster system; and
a management server connected to the at least one working server and the global storage device, wherein the management server is configured to:
for each of the at least one working server,
determine whether the working server is in an abnormal state; and
in response to determining that the working server is in an abnormal state, assign at least part of the global storage device to the working server and cause the working server to perform a first system recovery operation using the at least part of the global storage device.

2. The system of claim 1, wherein the at least one working server, the global storage device, and the management server are connected via wide ports using Serial Attached SCSI (SAS) protocols to form a storage area network (SAN).

3. The system of claim 1, wherein the global storage device includes a plurality of global storage units, and to assign at least part of the global storage device to the working server and cause the working server to perform a first system recovery operation using the at least part of the global storage device, the management server is further configured to:
select a target global storage unit storing the backup system or the system image file of the working server from the plurality of global storage units; and
assign the target global storage unit to the working server and cause the working server to perform the first system recovery operation using the target global storage unit.

4. The system of claim 1, wherein for each of the at least one working server, the working server is connected to a first local storage device, and to cause the working server to perform a first system recovery operation using the at least part of the global storage device, the management server is further configured to:
cause the working server to perform the first system recovery using the first local storage device;
detect that the first system recovery operation using the first local storage device is not successful; and
cause the working server to perform the first system recovery using the at least part of the global storage device.

5. The system of claim 4, wherein for each of the at least one working server, the management server is further configured to:
recover the first local storage device based on the backup system or the system image file of the working server;
determine whether the first local storage device recovers successfully; and
in response to determining that the first local storage device recovers successfully,
cause the working server to restart using the recovered first local storage device; and
cause the global storage device to be in a safe state under which the global storage device is inaccessible to the at least one working server and the management server.

6. The system of claim 5, wherein for each of the at least one working server, the management server is further configured to:
in response to determining that the first local storage device is not recovered successfully, cause the working server to keep operating using the at least part of the global storage device.

7. The system of claim 1, wherein the system further comprises at least one standby global storage device that stores the backup system or the system image file of each of the at least one working server.

8. The system of claim 1, wherein
a backup system or a system image file of the management server is stored in the global storage device,
the system further comprises a standby management server configured to take over one or more tasks of the management server when the management server is in an abnormal state.

9. The system of claim 8, wherein when the management server is in an abnormal state, the standby management server is configured to assign at least part of the global storage device to the management server and cause the management server to perform a second system recovery operation using the at least part of the global storage device.

10. The system of claim 8, wherein the management server is connected to a second local storage device, and to cause the management server to perform a second system recovery operation using the at least part of the global storage device, the standby management server is further configured to:
cause the management server to perform the second system recovery using the second local storage device;
detect that the second system recovery operation using the second local storage device is not successful; and
cause the management server to perform the second system recovery operation using the at least part of the global storage device.

11. The system of claim 1, wherein to assign at least part of the global storage device to the working server, the management server is configured to:
assign the at least part of the global storage device to the working server based on a count of working servers in the cluster system, a type of an operating system of the working server, an importance of the working server, and an performance of the global storage device.

12. The system of claim 3, wherein the plurality of global storage units have different power consumptions, capacities, and access speeds.

13. The system of claim 12, wherein to select a target global storage unit storing the backup system or the system image file of the working server from the plurality of global storage units, the management server is further configured to:
select the target global storage unit with a best performance from the plurality of global storage units; and
assign the target global storage unit to the working server.

14. A method implemented on a management server of a recovery system, the recovery system further comprising at least one working server configured to perform one or more tasks and a global storage device configured to store a backup system or a system image file of each of the at least one working server, the management server being connected to the at least one working server and the global storage device, wherein in response to determining that a cluster system operates normally, the global storage device is a safe state under which the global storage device is inaccessible to any other components in the cluster system, and the method comprising:

for each of the at least one working server,
determining whether the working server is in an abnormal state; and
in response to determining that the working server is in an abnormal state, assigning at least part of the global storage device to the working server and causing the working server to perform a first system recovery operation using the at least part of the global storage device.

15. The method of claim 14, wherein the global storage device includes a plurality of global storage units, and the assigning at least part of the global storage device to the working server and causing the working server to perform a first system recovery operation using the at least part of the global storage device comprises:

selecting a target global storage unit storing the backup system or the system image file of the working server from the plurality of global storage units; and
assigning the target global storage unit to the working server and cause the working server to perform the first system recovery operation using the target global storage unit.

16. The method of claim 14, wherein for each of the at least one working server, the working server is connected to a first local storage device, and the causing the working server to perform a first system recovery operation using the at least part of the global storage device comprises:

causing the working server to perform the first system recovery using the first local storage device;
detecting that the first system recovery operation using the first local storage device is not successful; and
causing the working server to perform the first system recovery using the at least part of the global storage device.

17. The method of claim 16, further comprising:
for each of the at least one working server,
recovering the first local storage device based on the backup system or the system image file of the working server;
determining whether the first local storage device recovers successfully; and
in response to determining that the first local storage device recovers successfully,
causing the working server to restart using the recovered first local storage device; and
causing the global storage device to be in a safe state under which the global storage device is inaccessible to the at least one working server and the management server.

18. The method of claim 17, further comprising:
for each of the at least one working server,
in response to determining that the first local storage device is not recovered successfully, causing the working server to keep operating using the at least part of the global storage device.

19. The method of claim 14, wherein a backup system or a system image file of the management server is stored in the global storage device, and the recovery system further comprises a standby management server configured to take over one or more tasks of the management server when the management server is in an abnormal state.

20. A non-transitory computer readable storage medium, comprising a set of instructions, the set of instructions being executed by a management server of a recovery system, the recovery system further comprising at least one working server configured to perform one or more tasks and a global storage device configured to store a backup system or a system image file of each of the at least one working server, and the management server being connected to the at least one working server and the global storage device, wherein in response to determining that a cluster system operates normally, the global storage device is a safe state under which the global storage device is inaccessible to any other components in the cluster system, and when the set of instructions are executed by at least one processor of the management server, the set of instructions causes the management server to perform a method, and the method comprising:

for each of the at least one working server,
determining whether the working server is in an abnormal state; and
in response to determining that the working server is in an abnormal state, assigning at least part of the global storage device to the working server and causing the working server to perform a first system recovery operation using the at least part of the global storage device.

\* \* \* \* \*